United States Patent [19]

Paul et al.

[11] Patent Number: 4,569,970
[45] Date of Patent: Feb. 11, 1986

[54] THERMOPLASTIC MOULDING COMPOSITIONS BASED ON POLYSILOXANE/POLYCARBONATE BLOCK COPOLYMERS

[75] Inventors: Winfried Paul; Hans-Jürgen Kress, both of Krefeld; Wolfgang Stix, Neckarsteinach; Christian Lindner, Cologne, all of Fed. Rep. of Germany; Dieter Neuray, Pittsburgh, Pa.; Werner Nouvertné, Krefeld, Fed. Rep. of Germany

[73] Assignee: Bayer Aktiengesellschaft, Leverkusen, Fed. Rep. of Germany

[21] Appl. No.: 642,448

[22] Filed: Aug. 20, 1984

[30] Foreign Application Priority Data

Aug. 31, 1983 [DE] Fed. Rep. of Germany ....... 3331438
Dec. 24, 1983 [DE] Fed. Rep. of Germany ....... 3347071

[51] Int. Cl.$^4$ ...................... C08L 69/60; C08L 51/04
[52] U.S. Cl. ...................................... 525/67; 524/504; 524/505; 525/74; 525/83; 525/84; 525/85; 525/92
[58] Field of Search .................... 525/64, 67, 71, 100, 525/101, 74

[56] References Cited

U.S. PATENT DOCUMENTS

| | | | |
|---|---|---|---|
| 3,961,122 | 6/1976 | Gaines et al. | 525/90 |
| 4,205,140 | 5/1980 | Liebig et al. | 525/67 |
| 4,263,409 | 4/1981 | Liberti | 521/81 |
| 4,443,581 | 4/1984 | Robeson et al. | 525/101 |
| 4,478,981 | 10/1984 | Arkles | 525/100 |

FOREIGN PATENT DOCUMENTS

0105388  4/1984  European Pat. Off. .
1581167 12/1980  United Kingdom .

*Primary Examiner*—Wilbert J. Briggs, Sr.
*Attorney, Agent, or Firm*—Connolly and Hutz

[57] ABSTRACT

The present invention relates to
A. Thermoplastic moulding materials based on polydiorganosiloxane/polycarbonate block copolymers and ABS polymers and
B. Thermoplastic moulding compositions based on polysiloxane/polycarbonate block copolymers, elastomeric polymers and, if appropriate, polyalkylene terephthalate.

6 Claims, No Drawings

THERMOPLASTIC MOULDING COMPOSITIONS BASED ON POLYSILOXANE/POLYCARBONATE BLOCK COPOLYMERS

The present invention relates to

A. Thermoplastic moulding compositions based on polydiorganosiloxane/polycarbonate block copolymers and ABS polymers and B. Thermoplastic moulding compositions based on polysiloxane/polycarbonate block copolymers, elastomeric polymers and, if appropriate, polyalkylene terephthalate.

A.

Thermoplastic mixtures of polycarbonates based on aromatic dihydroxy compounds and ABS polymers are known in principle (German Patent Specification No. 1,170,141 and German Auslegeschrift No. 1,810,993). Mixtures of aromatic polycarbonates with special ABS systems are described in German Patent Specification No. 2,259,565 (Le A 14 751), German Offenlegungsschrift No. 2,329,548 (Le A 15 106) and German Offenlegungsschrift No. 2,329,546 (Le A 15 107).

Such mixtures have to meet very high technological requirements. In this context, in particular, good toughness, especially at low temperatures, and improvements in the fire behaviour (tendency to drip) are required.

To date, these types of improvements in the properties could be achieved only by selective variation of the rubber and the additional use of flameproofing agents.

It was therefore surprising that this improved overall spectrum of properties could be achieved merely by the use of a modified polycarbonate. It was also surprising that when the polycarbonate modified with a diorganosiloxane block was mixed with ABS polymers, moulding compositions having good properties were obtained, in spite of the Si block.

Although European Offenlegungsschrift No. 0,073,067 discloses mixtures of aromatic polyesters, siloxane/polycarbonate block copolymers and thermoplastic styrene resins or thermoplastic alkyl acrylate resins, no particular technical advantages are claimed for the addition of styrene resin or alkyl acrylate resin.

The present invention relates to thermoplastic moulding compositions based on aromatic polycarbonates and ABS polymers, which have improved toughness when subjected to impact (notched impact strength), in particular at low temperatures, as well as better fire behaviour, characterised by a higher oxygen index and improved dripping characteristics.

The present invention thus relates to thermoplastic moulding compositions containing (a) 20-80 parts by weight of a polydiorganosiloxane polycarbonate block copolymer which has a mean molecular weight $\overline{M}_w$ of 10,000 to 200,000 and contains between about 75% by weight and 97.5% by weight of aromatic carbonate structural units and contains between 25% by weight and 2.5% by weight of polydiorganosiloxane structural units, the block copolymers being prepared from polydiorganosiloxanes which contain α,ω-bishydroxyaryloxy terminal groups and have a degree of polymerisation $\overline{P}_n$ of 5-100, (b) 70-5 parts by weight of a graft polymer of ethylenically unsaturated monomers on rubbers from the series comprising diene monomer, alkyl acrylate and EPDM rubbers, and (c) 5-60 parts by weight of a rubber-free thermoplastic polymer of vinyl monomers, the sum of the number of parts by weight of components (a)+(b)+(c) being 100 parts by weight in each case.

The component (a) can also be a mixture of polydiorganosiloxane/polycarbonate block copolymers with customary polysiloxane-free thermoplastic polycarbonates, the total content of polydiorganosiloxane structural units in this mixture being between 2.5 and 25% by weight.

In the context of the invention, polydiorganosiloxane/polycarbonate block copolymers (a) are reaction products obtained from diphenols, their reactive derivatives based on polydiorganosiloxane oligomers with reactive terminal groups or mixtures of the oligomers, carbonic acid precursors or mixtures of these reaction products.

Such polydiorganosiloxane/polycarbonate block copolymers are characterised in that they contain, in the polymer chain, aromatic carbonate structural units (1) on the one hand, and polydiorganosiloxanes containing aryloxy terminal groups (2) on the other hand

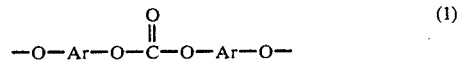

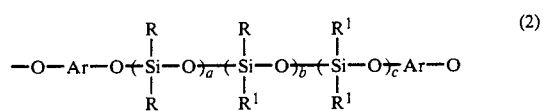

wherein

Ar are identical or different arylene radicals obtained from diphenols, and

R and $R^1$ are identical or different and denote linear alkyl, branched alkyl, alkenyl, halogenated linear alkyl, halogenated branched alkyl, aryl or halogenated aryl, but preferably methyl, and the number of diorganosiloxy units n (=a+b+c) is 5 to 100, preferably 20 to 80.

In the above formula (2), alkyl is, for example, $C_1$-$C_{20}$-alkyl; in the above formula (2), alkenyl is, for example, $C_2$-$C_6$-alkenyl; in the above formula (2), aryl is $C_6$-$C_{14}$-aryl. In the above formula, halogenated denotes partially or completely chlorinated, brominated or fluorinated. Examples of alkyls, alkenyls, aryls, halogenated alkyls and halogenated aryls are methyl, ethyl, propyl, n-butyl, tert.-butyl, vinyl, phenyl, naphthyl, chloromethyl, perfluorobutyl, perfluorooctyl and chlorophenyl.

Polydiorganosiloxane/polycarbonate block copolymers of this type are disclosed in, for example, U.S. Pat. No. 3,189,662, U.S. Pat. No. 3,821,325 and U.S. Pat. No. 3,832,419. Their improved mechanical properties at low temperatures are described in the relevant literature (for example B. M. Beach, R. P. Kambour and A. R. Schultz, J. Polym. Sci., Polym. Lett. Ed. 12, 247 (1974)).

Preferred polydiorganosiloxane/polycarbonate block copolymers having mean molecular weights $\overline{M}_w$ (weight average, as determined by ultracentrifuging or a light scattering measurement) of 10,000 to 200,000 and containing between about 75% by weight and 97.5% by weight of aromatic carbonate structural units and containing between 25 and 2.5% by weight of diorganosiloxy units are prepared by reacting polydiorganosiloxanes containing α,ω-bishydroxyaryloxy terminal groups with other diphenols, if appropriate with the concomitant use of chain terminators in the customary amounts, and if appropriate with the concomitant use of branching agents in the customary amounts, for example by the two-phase boundary method (in this context, see H. Schnell, Chemistry and Physics of Polycarbonates, Polymer Rev., Vol. IX, page 27 et seq., Interscience Publishers New York, 1964), the ratio of the bifunctional phenolic reactants is chosen in each case so that it gives the content, according to the invention, of aromatic carbonate structural units and diorganosiloxy units.

Such polydiorganosiloxanes containing $\alpha,\omega$-bishydroxyaryloxy terminal groups are disclosed in, for example, U.S. Pat. No. 3,419,634.

Diphenols to be employed for the preparation of the polydiorganosiloxanes containing $\alpha,\omega$-bishydroxyaryloxy terminal groups and of the polydiorganosiloxane/polycarbonate block copolymers are hydroquinone, resorcinol, dihydroxydiphenyls, bis-(hydroxyphenyl)-alkanes, bis-(hydroxyphenyl)-cycloalkanes, bis-(hydroxyphenyl) sulphides, bis (hydroxyphenyl) ethers, bis-(hydroxyphenyl) sulphoxides, bis-(hydroxyphenyl) sulphones and $\alpha,\omega$-bis-(hydroxyphenyl)-diisopropylbenzenes and their compounds which are alkylated in the nucleus and halogenated in the nucleus. These and other suitable aromatic dihydroxy compounds are listed in the U.S. Pat. Nos. 3,028,365 and 2,999,846 and in the German Offenlegungsschriften No. 2,063,050 and 2,211,957.

Examples of preferred diphenols are 2,2-bis-(4-hydroxyphenyl)-propane, 1,1-bis-(4-hydroxyphenyl)-cyclohexane, 2,2-bis-(3,5-dichloro-4-hydroxyphenyl)-propane, 2,2-bis-(3,5-dibromo-4-hydroxyphenyl)-propane, 2,2-bis-(3,5-dimethyl-4-hydroxyphenyl)-propane, bis-(3,5-dimethyl-4-hydroxyphenyl)-methane and bis-(4-hydroxyphenyl) sulphide.

The suitable diphenols can be employed both alone and as mixtures.

Branching agents which can be used are those having three or more than three functional groups, in particular those having three or more than three phenolic hydroxyl groups, and the customary known amounts of branching agent of between 0.05 and 2 mol %, relative to diphenols incorporated, should be maintained. The preparation of branched polycarbonates is described in, for example, German Offenlegungsschrift No. 1,570,533 and German Offenlegungsschrift No. 1,595,762 and in U.S. Pat. No. 3,544,514.

Examples of some of the usable compounds having three or more than three phenolic hydroxyl groups are 2,4-bis-(4-hydroxyphenyl-isopropyl)-phenol, 2,6-bis-(2'-hydroxy-5-methyl-benzyl)-4-methylphenol, 2-(4-hydroxyphenyl)-2-(2,4-dihydroxyphenyl)-propane and 1,4-bis-(4,4'-dihydroxytriphenyl-methyl)-benzene. Some of the other trifunctional compounds are 2,4-dihydroxybenzoic acid, trimesic acid, cyanuric chloride and 3,3-bis-(4-hydroxyphenyl)- 2-oxo-2,3-dihydroindole as well as 3,3-bis-(4-hydroxy-3-methyl-phenyl)-2-oxo-2,3-dihydroindole.

Compounds which can be used as chain terminators in the preparation by the two-phase boundary method are aromatic compounds containing a functional group, such as aromatic acid halides or phenols, in particular the conventional phenols, such as, for example, p-tert.-butylphenol, p-chlorophenol, 2,4,6-tribromophenol and phenol, these being used in the customary amount, which is governed by the molecular weight to be achieved in each case for the block copolymers according to the invention. In general, 0.5 mol % to 10.0 mol %, relative to diphenols employed, are used.

In the context of the invention, graft polymers (b) are those in which either a monomer from the styrene series, methyl methacrylate or a monomer mixture of 95–50% by weight of styrene, $\alpha$-methylstyrene, methyl methacrylate or mixtures thereof and 5–50% by weight of acrylonitrile, methyl methacrylate, maleic anhydride, N-substituted maleimides or mixtures thereof are grafted on to a rubber. Suitable rubbers are, in particular, polybutadiene, butadiene/styrene copolymers containing up to 30% by weight of styrene as copolymerised units, copolymers of butadiene and acrylonitrile containing up to 20% by weight of acrylonitrile, or copolymers of butadiene containing up to 20% by weight of a lower alkyl ester of acrylic or methacrylic acid (for example methyl acrylate, ethyl acrylate, methyl methacrylate and ethyl methacrylate).

Examples of other suitable rubbers are polyisoprene or polychloroprene. Alkyl acrylate rubbers based on $C_1$–$C_8$-alkyl acrylates, in particular ethyl, butyl or ethylhexyl acrylate, are also suitable. These alkyl acrylate rubbers can, if appropriate, contain up to 30% by weight of monomers, such as vinyl acetate, acrylonitrile, styrene, methyl methacrylate or vinyl ether, as copolymerised units. These alkyl acrylate rubbers can furthermore contain relatively small amounts (up to 50% by weight) of crosslinking ethylenically unsaturated monomers. Examples of such compounds are alkylenediol di(meth) acrylates, polyester di(meth) acrylates, di- and tri-vinylbenzene, triallyl cyanurate, allyl (meth) acrylate, butadiene, isoprene etc. Such alkyl acrylates are known. Acrylate rubbers used as a grafting base can also be products which contain, as a core, a crosslinked diene rubber consisting of one or more conjugated dienes, such as polybutadiene, or a copolymer of a conjugated diene with an ethylenically unsaturated monomer, such as styrene and/or acrylonitrile. Examples of other suitable rubbers are EPDM rubbers, that is to say rubbers obtained from ethylene, propylene and an unconjugated diene monomer.

Diene monomer rubbers or alkyl acrylate rubbers are preferred.

The graft copolymers (b) contain 5–80% by weight, in particular 20–70% by weight, of rubber and 95–20% by weight, in particular 80 to 30% by weight, of grafted monomers. The rubbers are present in these graft copolymers in the form of at least partially crosslinked particles having a mean particle size from 0.09 to 5 $\mu$m, in particular from 0.1 to 1 $\mu$m. Graft copolymers of this tyoe are prepared by free-radical graft copolymerisation of monomers from the series comprising styrene, $\alpha$-methylstyrene, acrylonitrile, methyl methacrylate and maleic anhydride in the presence of the rubbers to be grafted, and are all known. Preferred preparation processes for such graft copolymers are emulsion polymerisation, solution polymerisation, mass polymerisation or suspension polymerisation.

So-called ABS polymers are particularly preferred.

The rubber-free polymers of vinyl monomers (c) can be composed of the graft monomers or similar monomers, in particular of at least one monomer from the series comprising styrene,$\alpha$-methylstyrene, halogenostyrene, acrylonitrile, methacrylonitrile, methyl methacrylate, maleic anhydride, vinyl acetate and N-substituted maleimide. They are preferably copolymers consisting of 95–50% by weight of styrene, $\alpha$-methylstyrene, methyl methacrylate or mixtures thereof, with 5-50% by weight of acrylonitrile, methacrylonitrile, methyl methacrylate, maleic anhydride or mixtures thereof. Such copolymers are frequently formed in graft copolymerisation as by-products, particularly when large amounts of monomers are grafted onto small amounts of rubber. In addition to, or instead of, the copolymers thus formed, it is also possible to admix separately prepared copolymers of this type. On the other hand, the ungrafted resin moieties present in the graft polymers need not necessarily be chemically identical to the admixed thermoplastic vinyl polymer (c).

Separately prepared copolymers of this type are resin-like, thermoplastic and rubber-free; they are, in particular, copolymers of styrene and/or α-methylstyrene with acrylonitrile, if appropriate mixed with methyl methacrylate.

Particularly preferred copolymers consist of 20–40% by weight of acrylonitrile and 80 - 60% by weight of styrene or α-methylstyrene. Such copolymer materials are known, and can be prepared, in particular, by free-radical polymerisation processes, in particular by emulsion polymerisation, suspension polymerisation, solution polymerisation or mass polymerisation. The copolymers preferably have molecular weights of 15,000 to $2 \cdot 10^5$.

The moulding compositions according to the invention can be obtained by mixing the individual components. In a preferred preparation method, a latex of a graft copolymer (b) is first precipitated and dried. The powder thus obtained is then mixed with the polydiorganosiloxane polycarbonate block copolymer (a) and the separately prepared copolymer (c).

For example, roll mills, screw extruders or kneaders are suitable for this purpose.

Either the individual components of the moulding compositions according to the invention contain additives, such as stabilisers, pigments, free-flow agents, lubricants, mould-release agents, antistatics and/or flameproofing agents, or these additives can be added during mixing of the individual components. Suitable additives are those which are customary for thermoplastic polycarbonates, graft polymers or thermoplastic vinyl polymers.

The moulding compositions of the present invention can be used for the production of shaped articles of any kind. In particular, shaped articles can be produced by injection moulding. Examples of shaped articles which can be produced are: housing components of any kind (for example for household appliances, such as juice extractors, coffee machines and mixers) or cover plates for the building sector and components for the automobile sector. They are also employed in the field of electrotechnology, because they are distinguished by very good electrical properties.

In the examples which follow, the following polydiorganosiloxane/polycarbonate block copolymers were used:

(a1) A copolycarbonate based on bisphenol A and 4.5% by weight of polydimethylsiloxane having a block length ($\overline{P}_n$) of 40, with a relative solution viscosity of 1.31, measured in $CH_2Cl_2$ at 25° C. and a concentration of 0.5% by weight.

(a2) A copolycarbonate based on bisphenol A and 10% by weight of polydimethylsiloxane having a block length ($\overline{P}_n$) of 40, with a relative solution viscosity of 1.29.

(a3) A comparative polycarbonate based on bisphenol A, with a relative solution viscosity of 1.29.

(a4) A copolycarbonate according to (a1), except that it contains 5% by weight of polydimethylsiloxane and has a relative solution viscosity of 1.29.

The determination of the siloxane content, that is to say the proportion of dimethylsiloxy units in % by weight, relative to the total weight of the block copolymer, is carried out gravimetrically and by means of nuclear resonance spectrometry. The mean siloxane block length is stated as the degree of polymerisation $\overline{P}_n$ found by determining the terminal groups in the siloxane prepolymer.

For the examples listed, the components (b) and (c) were used as an ABS polymer. (b) 40 parts by weight of a graft polymer, prepared by grafting 35 parts by weight of styrene and 15 parts by weight of acrylonitrile onto 50 parts by weight of a coarse-particled polybutadiene (obtained via emulsion polymerisation, according to the preparation data of German Auslegeschriften Nos. 1,247,665 and 1,269,360), the mean particle diameter of the polybutadiene grafting base present in latex form being between 0.3 and 0.4 μm. (This particle size information and the corresponding information in the text represent mean particle diameters ($d_{50}$) and are determined by ultracentrifuge measurement (in this context, see: W. Scholtan et al. Colloids. Z. Polymere, 250 (1972), pages 783–796); (c) 60 parts by weight of a styrene/acrylonitrile copolymer having a styrene/acrylonitrile ratio of 70:30 and an intrinsic viscosity of $[\eta]=0.79$ dl/g (measured in dimethylformamide at 20° C.).

The moulding compositions of the examples below were prepared in a twin-screw extruder at about 260° C., by mixing the individual components.

The notched impact strength and the impact strength were determined on standard small bars, on the basis of DIN 53,453/ISO R 179. The Vicat heat-distortion resistance was determined in accordance with DIN 53,460. The oxygen index was determined on 10 standard small bars, in accordance with ASTM-D 2863. The dripping behaviour was determined using bars having the dimensions 127 × 12.7 × 3.2 mm. For this purpose, groups of 5 specimens were ignited by means of two successive ignition processes of 10 seconds duration, and the number of specimens dripping flaming particles was determined. The experimental arrangement corresponded to the data stated according to UL 94 (Underwriters' Laboratories, Inc.) for the UL 94 V test.

| Composition | Dimension | 1. | 2. | 3. (compar.) | 4. |
|---|---|---|---|---|---|
| Copolycarbonate a1 | % | 70 | — | — | — |
| Copolycarbonate a2 | % | — | 70 | — | — |
| Homopolycarbonate a3 | % | — | — | 70 | — |
| Copolycarbonate a4 | % | — | — | — | 70 |
| Polymer b + c | % | 30 | 30 | 30 | 30 |
| Notched impact strength | | | | | |
| at room temperature | kJ/m² | 43* | 29 | 23 | 25 |
| at −20° C. | kJ/m² | 47* | — | 12 | 19 |
| at −40° C. | kJ/m² | 29 | 23 | 9 | 20 |
| Vicat B temperature | °C. | 131 | 122 | 127 | 127 |
| O₂ index | % | 26.0 | 25.5 | 23.5 | — |
| Number of specimens dripping flaming particles | | 0 | 0 | 5 | 0 |

*fractured

B. Mixtures of polycarbonates and polymers are known (see, for example, Japanese Patent Publication No. 18 611 68 (Teijin, Priority 30.6.65), U.S.

Pat. No. 3,663,471 (Le A 11 969), U.S. Pat. No. 3,437,631 (Mo 936), U.S. Pat. No. 4,299,928 (Mo 2062) or German Offenlegungsschrift No. 3,114,494).

Compared with pure polycarbonate, such mixtures have improved toughness properties.

Thermoplastic moulding compositions based on polydiorganosiloxane/polycarbonate block copolymers and polyalkylene terephthalates are known; see, for example, U.S. Pat. No. 4,161,469 and U.S. Pat. No. 4,161,498. They are said to be distinguished by improved impact strength and heat-distortion resistance.

European Offenlegungsschrift No. 0,073,067 discloses mixtures of aromatic polyesters, siloxane/polycarbonate block copolymers, polyesters of diols with aromatic dicarboxylic acids and thermoplastic styrene resins or thermoplastic alkyl acrylate resins, which are distinguished by improved notched impact strength compared with the aromatic polyesters.

Although the stated moulding compositions possess many advantageous properties, they do not meet some special requirements, as set, for example, for device components in the engine space of motor vehicles, such as heat-distortion resistance, freedom from distortion, resistance to petrol and good toughness at low temperatures.

Surprisingly, it has now been found that mixtures of a polydiorganosiloxane/polycarbonate block copolymer and an elastomeric polymer having a glass transition temperature below $-20°$ C. exhibit high heat-distortion resistance as well as a transition, between the tough state and the brittle state, which is substantially shifted toward lower temperatures.

If it is necessary to have particularly high resistance to petrol coupled with an otherwise constant spectrum of properties, it is appropriate to add polyalkylene terephthalate.

The invention relates to thermoplastic moulding compositions containing:
(a) 10-98, preferably 30-90, parts by weight of a polydiorganosiloxane/polycarbonate block copolymer having a mean molecular weight $\overline{M}_w$ of 10,000 to 200,000 and containing between 75% by weight and 97.5% by weight of aromatic carbonate structural units and containing between 25% by weight and 2.5% by weight of polydiorganosiloxane structural units, the block copolymers being prepared from polydiorganosiloxanes which contain $\alpha,\omega$-bishydroxyaryloxy terminal groups and have a degree of polymerisation $\overline{P}_n$ of 5 to 100,
(d) 1-30, preferably 5-20, parts by weight of elastomeric polymers having a glass transition temperature of below $-20°$ C. and
(e) 0-50 parts by weight of thermoplastic polyalkylene terephthalates, the sum of the number of parts by weight of components (a)+(d)+(e) being 100 parts by weight in each case.

The component (a) can also be a mixture of polydiorganosiloxane/polycarbonate block copolymers containing customary polysiloxane-free thermoplastic polycarbonates, the total content of polydiorganosiloxane structural units in this mixture being between 2.5 and 25% by weight.

The polydiorganosiloxane/polycarbonate block copolymers are the block copolymers characterised in Part A.

The elastomeric polymers (d) comprise copolymers, in particular graft copolymers, which have elastomeric properties and are essentially obtainable from at least two of the following monomers: chloroprene, butadiene, isoprene, isobutene, styrene, acrylonitrile, ethylene, propylene, vinyl acetate, (meth) acrylates having 1-18 C atoms in the alcohol component, and carbon monoxide, that is to say polymers as described in, for example, "Methoden der Organischen Chemie" ("Methods of Organic Chemistry"), (Houben-Weyl), Vol. 14/1, Georg Thieme-Verlag, Stuttgart 1961, pages 393–406, and in C. B. Bucknall, "Toughened Plastics", Appl. Science Publishers, London 1977. Preferred polymers for component (d) have a gel content of more than 20, preferably more than 40, by weight.

Preferred polymers for component (d) are ethylene vinyl acetate copolymers containing 15–70% by weight of vinyl acetate and having melt indices from non-free-flowing to 1,000, preferably 0.1–20, measured at 190° C. and with a load of 2.16 kp, in accordance with DIN 53,753. Terpolymers obtained from ethylene, alkyl acrylates or vinyl acetate and carbon monoxide are also preferred.

Examples of preferred polymers for component (d) are the so-called EPM and EPDM rubbers, in which the weight ratio of ethylene radicals to propylene radicals is in the range from 40:60 to 90:10, preferably 40:60 to 65:35.

The Mooney viscosities (ML 1+4/100° C. in accordance with DIN 53,523) of the non-crosslinked EPM and EPDM rubbers are between 25 and 100 MU, preferably between 35 and 90 MU. The gel contents of the non-crosslinked EPM and EPDM rubbers are below 1% by weight.

The ethylene/propylene copolymers (EPM) used contain virtually no double bonds, whereas the ethylene propylene/diene terpolymers (EPDM) can contain 1-20 double bonds/1,000 C atoms. Examples of suitable diene monomers in EPDM which may be mentioned are conjugated dienes, for example isoprene and butadiene, and nonconjugated dienes having 5-25 C atoms, for example 1,4-pentadiene, 1,4-hexadiene, 1,5-hexadiene, 2,5-dimethyl-1,5-hexadiene and 1,4-octadiene, cyclic dienes, for example cyclopentadiene, cyclohexadiene, cyclooctadiene and dicyclopentadiene; alkenylnorbornenes, for example 5-ethylidene-2-norbornene, 5-butylidene-2-norbornene, 2-methallyl-5-norbornene and 2-isopropenyl-5-norbornene, and tricyclodienes, for example 3-methyltricyclo-(5,2,1,0,2,6)-3,8-decadiene. The non-conjugated dienes 1,5-hexadiene, ethylidenenorbornene and dicyclopentadiene may be preferably mentioned. The diene content in the EPDM is preferably 0.5 to 10% by weight.

EPM and EPDM rubbers of this type are described in, for example, German Offenlegungsschrift 2,808,709 (Le A 18 705).

Preferred polymers for component (d) are also block copolymers, which may be selectively hydrogenated, of a vinyl-aromatic monomer X and a conjugated diene Y, of the X-Y type or X-(Y-X)$_r$ type (with r=1-5) or Y-(X)$_s$ type (with s=3-5).

These block copolymers can be prepared by known processes. In general, the preparation of suitable X-Y block copolymers from styrene, $\alpha$-methylstyrene, vinyltoluene etc. and from conjugated dienes, such as butadiene, isoprene etc., can be carried out using the technology employed for the preparation of styrene/diene block copolymers, this technology being described in "Encyclopedia of Polymer Science and Technology", Vol. 15, Interscience, N.Y. (1971), on pages 508 et seq. The selective hydrogenation can be carried out in ways which are in themselves known, and means that the ethylenic double bonds are essentially completely hydrogenated, the aromatic double bonds essentially remaining unaffected. Selectively hydrogenated block copolymers of this type are described in, for example, German Offenlegungsschrift No. 3,000,282.

Examples of preferred polymers for component (d) are butadiene/styrene copolymers, poly(meth) acrylates and polybutadienes onto which styrene and/or acrylonitrile and/or (meth)acrylates are grafted, for example copolymers of styrene or alkylstyrene and conjugated dienes (high-impact polystyrene), that is to say copolymers of the type described in German Offenlegungsschrift No. 1,694,173 (=U.S. Pat. No. 3,564,077), and butadiene/styrene or butadiene/acrylonitrile copolymers, polyisobutenes, polyisoprenes or polybutadienes onto which acrylates or methacrylates, vinyl acetate, acrylonitrile, styrene and/or alkylstyrenes are grafted, as described in, for example, German Offenlegungsschrift No. 2,348,377 (=U.S. Pat. No. 3,919,353).

Examples of particularly preferred polymers for component (d) are graft polymers which are obtainable by grafting I. 10-40, preferably 10-35, in particular 15-25, % by weight, relative to the grafted product, of at least one (meth)acrylate and/or a mixture of 10-35, preferably 20-35, % by weight, relative to the mixture, of acrylonitrile and 65-90, preferably 65-80, by weight, relative to the mixture, of styrene onto II. 60-90, preferably 65-90, in particular 75-85, % by weight, relative to the grafted product, of a butadiene polymer containing at least 70% by weight, relative to II, of butadiene radicals as the grafting base, preferably the proportion of gel in the grafting base II being 70% (measured in toluene), the degree of grafting g being 0.15 to 0.55 and the mean particle diameter $d_{50}$ of the graft polymer being 0.2-0.6, preferably 0.3-0.5, μm.

(Meth)acrylates I are esters of acrylic acid or methacrylic acid and monohydric alcohols having 1-18 C atoms.

The grafting base II can contain, in addition to butadiene radicals, up to 30% by weight, relative to II, of radicals of other ethylenically unsaturated monomers, such as, for example, styrene, acrylonitrile, and esters of acrylic or methacrylic acid having 1-4 C atoms in the alcohol component (such as methyl acrylate, ethyl acrylate, methyl methacrylate and ethyl methacrylate). The preferred grafting base II consists of pure polybutadiene.

Since, in the grafting reaction, the graft monomers I are usually not completely grafted onto the grafting base II, in accordance with the invention graft polymers are also understood as meaning those products which, in addition to the actual graft polymers, also contain homopolymers and copolymers of the graft monomers I employed. In the context of the invention, graft polymers are those which are obtained by graft polymerisation of vinyl monomers in the presence of a polymer II.

The mean particle size $d_{50}$ is that diameter above and below which lie the diameters of 50% by weight of the particles in each case. It can be determined by means of ultracentrifuge measurements (W. Scholtan and H. Lange, Kolloid. Z. und Z. Polymere 250 (1972), 782-796), or by means of electron microscopy followed by particle counting (G. Kampf and H. Schuster, Angew. Makromolekulare Chemie 14, (1970), 111-129), or by means of light-scattering measurements.

Other examples of particularly preferred polymers for component (d) are graft polymers consisting of III. as the grafting base, 25-98% by weight, relative to component (d), of an acrylate rubber having a glass transition temperature of below −20° C., and IV. as the grafting monomers, 2-75% by weight, relative to component (d), of at least one polymerisable ethylenically unsaturated monomer whose homopolymers or copolymers formed in the presence of III have a glass transition temperature of above 25° C.

The acrylate rubbers III of the polymers for component (d) are preferably polymers obtained from alkyl acrylates, if appropriate with up to 40% by weight of other polymerisable ethylenically unsaturated monomers. If the acrylate rubbers employed as the grafting base III (as described below) are in turn already grafted products having a diene rubber core, the diene rubber core is not taken into account when calculating the percentages. The preferred polymerisable acrylates include $C_1$-$C_8$-alkyl esters, for example the methyl, ethyl, butyl, octyl and 2-ethylhexyl esters, halogenoalkyl esters, preferably halogeno-$C_1$-$C_8$-alkyl esters, such as chloroethyl acrylate, and aromatic esters, such as benzyl acrylate and phenethyl acrylate. They can be employed alone or as a mixture.

The acrylate rubbers III can be non-crosslinked or crosslinked, but are preferably partially crosslinked.

In order to achieve crosslinking, it is possible to copolymerise monomers having more than one polymerisable double bond. Preferred examples of monomers which effect crosslinking are esters of unsaturated monocarboxylic acids having three to eight C atoms and unsaturated monohydric alcohols having 3-12 C atoms or saturated polyols having 2-4 OH groups and 2-20 C atoms, such as, for example, ethylene glycol dimethacrylate and allyl methacrylate; polyunsaturated heterocyclic compounds, such as, for example, trivinyl and triallyl cyanurate and isocyanurate and tris-acryloyl-s-triazines, in particular triallyl cyanurate; polyfunctional vinyl compounds, such as di- and trivinylbenzene, as well as triallyl phosphate and diallyl phthalate.

Preferred monomers which effect crosslinking are allyl methacrylate, ethylene glycol dimethacrylate, diallyl phthalate and heterocyclic compounds which have at least three ethylenically unsaturated groups.

Particularly preferred monomers which effect crosslinking are the cyclic monomers triallyl cyanurate, triallyl isocyanurate, trivinyl cyanurate, triacryloylhexahydro-s-triazine and triallylbenzenes.

The amount of monomers which effect crosslinking is preferably 0.02 to 5, in particular 0.05-2, % by weight, relative to the grafting base III.

In the case of cyclic monomers which effect crosslinking and have at least 3 ethylenically unsaturated groups, it is advantageous to restrict the amount to 1% by weight of the grafting base III.

Examples of preferred "other" polymerisable ethylenically unsaturated monomers which, if appropriate, can be used, in addition to the acrylates, for the preparation of the grafting base III are acrylonitrile, styrene, α-methylstyrene, acrylamides, vinyl $C_1$-$C_6$-alkyl ethers, butadiene and isoprene. Acrylate rubbers which are preferred as the grafting base III are emulsion polymers which have a gel content of 60% by weight.

The gel content of the grafting base III is determined at 25° C. in dimethylformamide (M. Hoffmann, H. Krömer and R. Kuhn, Polymeranalytik I and II, Georg Thieme-Verlag Stuttgart 1977).

Acrylate rubbers used as the grafting base III can also be products which contain, as the core, a crosslinked diene rubber consisting of one or more conjugated dienes, such as polybutadiene, or a copolymer of a conjugated diene with an ethylenically unsaturated monomer, such as styrene and/or acrylonitrile.

The proportion of the polydiene core in the grafting base III can be 0.1 to 80, preferably 10–50, % by weight, relative to III. The shell and the core, independently of one another, can be non-crosslinked, partially crosslinked or highly crosslinked.

Particularly preferred grafting bases III for graft polymers, according to component (d), which are based on polyacrylates may have the following composition:
1. Acrylate polymers and copolymers without a diene rubber core and
2. Acrylate polymers and copolymers, which contain a diene rubber core.

The grafting yield, that is to say the quotient of the amount of monomer IV grafted on and the amount of graft monomer IV employed, is as a rule 20–80% by weight. The determination can be carried out as described in M. Hoffmann, H. Krömer and R. Kuhn, Polymeranalytik, Vol. 1, Georg Thieme-Verlag, Stuttgart 1977.

Preferred graft monomers IV are α-methylstyrene, styrene, acrylonitrile, methyl methacrylate or mixtures of these monomers. Preferred graft monomer mixtures are those of styrene and acrylonitrile in the weight ratio 90:10 to 50:50.

Such graft polymers for component (d), based on polyacrylates, are described, for example, in German Auslegeschrift No. 2,444,584 (=U.S. Pat. No. 4,022,748) and in German Offenlegungsschrift No. 2,726,256 (=U.S. Pat. No. 4,096,202).

Particularly advantageous graft polymers of this type are obtained if 2–20, preferably 2–15, % by weight, relative to (d), of monomer IV are grafted onto 80–98, preferably 85–97, % by weight, relative to (d), of the latex of III, which has been completely broken and suspended in water, in the absence of suspending agents. The pulverulent graft polymer obtained can then be dried, and homogenised, in the desired ratio and under the action of shear forces, with the other components, so that the mean particle size $d_{50}$ of component (d) in the mixture according to the invention is 0.05–3, preferably 0.1–2, in particular 0.2–1, μm.

The expression "in the absence of suspending agents" means the absence of substances which, depending on the type and the amount, would be capable of suspending the graft monomers IV in the aqueous phase. The definition does not exclude the presence of substances which, for example, have acted as suspending agents in the preparation of a grafted grafting base III; in such cases, the coagulating agent or precipitating agent which is used to break the latex III has to be added in an amount which compensates the suspending action of the substances employed in the previous stage; in other words, care must be taken to ensure that the graft monomers IV do not form a (stable) emulsion or dispersion in the aqueous phase.

A graft polymer for component (d), prepared in this way in the absence of suspending agents, can be dispersed, as a component of the moulding compositions according to the invention, in the other resin components to give an extremely small particle size, which remains relatively unchanged even over fairly long processing periods at elevated temperature.

The expression "extremely small particle size" means that the number, shape and size of the graft polymer particles to be employed essentially correspond, even after the homogenisation procedure, to the number, shape and size of the graft polymer particles introduced into the molten, other resin components.

It is also possible to use, as the grafting base III, those acrylate rubbers which are obtained as an aqueous emulsion (latex), and the latex particles of which contain 1–20% by weight, preferably 1–10% by weight, relative to III, of monomers which are already grafted on in aqueous emulsion and whose homopolymers or copolymers would have glass transition temperatures >0° C.

Preferred grafted-on monomers of this type are alkyl acrylates, alkyl methacrylates, styrene, acrylonitrile, α-methylstyrene and/or vinyl acetate.

Grafting bases III of this type are prepared by, for example, emulsion polymerisation or emulsion graft polymerisation. However, they can also be prepared by preparing an acrylate rubber by solution or mass polymerisation, then grafting on the graft monomers, and thereafter converting these rubbers to an aqueous emulsion which is suitable for further grafting processes.

Suitable grafting bases III for acrylate rubbers of this particular embodiment are therefore, in addition to the polymers listed on page 19, graft polymers which have been prepared in aqueous emulsion from acrylate polymers or copolymers which, if appropriate, contain a diene rubber core, and ethylenically unsaturated polymerisable monomers.

In the context of the invention, polyalkylene terephthalates for component (e) are reaction products of aromatic dicarboxylic acids or their reactive derivatives (for example dimethyl esters or anhydrides) and aliphatic, cycloaliphatic or araliphatic diols, and mixtures of these reaction products.

Preferred polyalkylene terephthalates for component (e) can be prepared from terephthalic acid (or its reactive derivatives) and aliphatic or cycloaliphatic diols having 2–10 C atoms, by known methods (Kunststoff Handbuch (Plastics Handbook), Vol. VIII, page 695 et seq., Carl Hanser Verlag, Munich 1973).

Preferred polyalkylene terephthalates for component (e) contain at least 80, preferably at least 90, mol %, relative to the dicarboxylic acid component, of terephthalic acid radicals, and at least 80, preferably at least 90, mol %, relative to the diol component, of ethylene glycol and/or 1,4-butanediol radicals.

The preferred polyalkylene terephthalates (e) can contain, in addition to terephthalates, up to 20 mol % of radicals of other aromatic dicarboxylic acids having 8–14 C atoms or aliphatic dicarboxylic acids having 4–12 C atoms, such as, for example, radicals of phthalic acid, isophthalic acid, naphthalene-2,6-dicarboxylic acid, 4,4'-diphenyldicarboxylic acid, succinic acid, adipic acid, sebacic acid, azelaic acid or cyclohexanediacetic acid.

The preferred polyalkylene terephthalates (e) can contain, in addition to ethylene glycol or 1,4-butanediol radicals, up to 20 mol % of other aliphatic diols having 3-12 C atoms or cycloaliphatic diols having 6-21 C atoms, for example radicals of 1,3-propanediol, 2-ethyl-1,3-propanediol, neopentylglycol, 1,5-pentanediol, 1,6-hexanediol, cyclohexane-1,4-dimethanol, 3-methyl-2,4-pentanediol, 2-methyl-2,4-pentanediol, 2,2,4-trimethyl-1,3-pentanediol, 2,2,4-trimethyl-1,6-pentanediol, 2-ethyl-1,3-hexanediol, 2,2-diethyl-1,3-propanediol, 2,5-hexanediol, 1,4-di-$\beta$-hydroxyethoxy)-benzene, 2,2-bis-(4-hydroxycyclohexyl)-propane, 2,4-dihydroxy-1,1,3,3-tetramethylcyclobutane, 2,2-bis (3-$\beta$-hydroxyethoxyphenyl)-propane and 2,2-bis-(4-hydroxypropoxyphenyl)-propane (German Offenlegungsschriften Nos. 2,407,647, 2,407,776 and 2,715,932).

The polyalkylene terephthalates for component (e) can be branched by incorporating relatively small amounts of trihydric or tetrahydric alcohols or tribasic or tetrabasic carboxylic acids, as described in, for example, German Offenlegungsschrift No. 1,900,270 and U.S. Pat. No. 3,692,744. Examples of preferred branching agents are trimesic acid, trimellitic acid, trimethylolethane and propane and pentaerythritol. It is advisable to use no more than 1 mol % of the branching agent, relative to the acid component.

Particularly preferred polyalkylene terephthalates (e) are those which have been prepared solely from terephthalic acid and its reactive derivatives (for example its dialkyl esters) and ethylene glycol and/or 1,4-butanediol, and mixtures of these polyalkylene terephthalates.

Other preferred polyalkylene terephthalates (e) are copolyesters which are prepared from at least two of the abovementioned alcohol components; particularly preferred copolyesters are poly-(ethylene glycol/1,4-butanediol) terephthalates.

The polyalkylene terephthalates preferably used as component (e) generally have an intrinsic viscosity of 0.4-1.5 dl/g, preferably 0.5-1.3 dl/g, in particular 0.6-1.2 dl/g, measured in phenol/o-dichlorobenzene (1:1 parts by weight) at 25° C. in each case.

To further increase the petrol-resistance of the mixtures according to the invention which contain the components (a), (d) and, if appropriate, (e), up to 5% by weight, relative to the total weight of the components (a)+(d) and, if appropriate, (e), of ethylene homopolymers or copolymers can also be added. In this context, ethylene copolymers are polyethylenes the radicals of which, in addition to consisting of ethylene radicals, consist of up to 30% by weight, relative to the ethylene copolymer, of radicals of other copolymerisable monomers, such as, for example, (meth)acrylic acid.

The moulding compositions according to the invention which are based on the components (a), (d) and, if appropriate, (e), can contain the additives customarily used in polycarbonate chemistry, rubber chemistry and polyester chemistry, such as lubricants, mould-release agents, nucleating agents, stabilisers, fillers, reinforcing substances, flameproofing agents and dyestuffs.

The moulding compositions containing fillers and reinforcing agents and based on the components (a), (d) and, if appropriate, (e), can contain up to 30% by weight, relative to the reinforced moulding composition, of fillers and/or reinforcing substances. Preferred reinforcing substances are glass fibres. Preferred fillers which can also have a reinforcing effect are glass spheres, mica, silicates, quartz, talc, titanium dioxide and wollastonite.

The moulding compositions which contain flameproofing agents and are based on the components (a)+(d) and, if appropriate, (e), can contain flameproofing agents in a concentration of, in general, less than 30% by weight, relative to the flameproofed moulding compositions. All flameproofing agents known to be used for polyester moulding compositions are suitable, such as, for example, polyhalogenodiphenyl, polyhalogenodiphenyl ethers, polyhalogenophthalic acid and its derivatives and polyhalogenooligo- and -polycarbonates, the corresponding bromine compounds being particularly effective. Synergistic agents, such as, for example, antimony trioxide, can also be used concomitantly.

The moulding compositions according to the invention which are based on the components (a), (d) and, if appropriate, (e) can be prepared in the customary mixing units, such as mills, kneaders and single-screw and multiple-screw extruders. The moulding compositions according to the invention which are based on the components (a), (d) and, if appropriate, (e) can be processed to shaped articles which exhibit an extremely small amount of distortion, even when subjected to a thermal load for a relatively long time. Although, in most cases, the resin components (a), (d) and (e) are advantageously mixed in a single step, it may sometimes also be advisable initially to omit one component, and only to admix this subsequently.

The following polymers were used in the examples listed:

(d1) A polymer which consists of 75% by weight of a grafting base composed of crosslinked polybutadiene (gel content above 70%, measured in toluene) and 25% by weight of a graft composed of 28% of acrylonitrile and 72% of styrene, the particle diameter of the grafting base in latex form being between 0.3 and 0.4 $\mu$m.

(d2) A polymer which consists of a grafting base composed of 79.2 parts by weight of n-butyl acrylate, which is crosslinked with 0.4 part by weight of butylene 1,3-diacrylate and in which 0.4 part by weight of diallyl maleate is incorporated in the form of graft monomers, and of a graft composed of 20 parts by weight of a polymethacrylate.

The following polydiorganosiloxane/polycarbonate block copolymers were used in the examples listed:

(a1) A copolycarbonate which is based on bisphenol A and 4.5% by weight of polydimethylsiloxane having a block length ($\overline{P}_n$) of 40, and has a relative solution viscosity of 1.31 (measured in $CH_2Cl_2$ at 25° C. and at a concentration of 0.5 g/100 ml).

The determination of the siloxane content, that is to say the proportion of dimethylsiloxy units in % by weight, relative to the total weight of the block copolymer, is carried out gravimetrically and by nuclear resonance spectrometry. The mean siloxane block length is stated as the degree of polymerisation $\overline{P}_n$ found by determining the terminal groups in the siloxane prepolymer.

(a3) For the comparative examples, a homopolycarbonate based on bisphenol A and having a relative solution viscosity of 1.29 was used.

(e) A polybutylene terephthalate having an intrinsic viscosity of 1.18 dl/g, measured in phenol/o-dichlorobenzene (1:1) at 25° C., was also used in the examples listed.

In some cases, an ethylene copolymer containing 4% by weight of acrylic acid and 12% by weight of tert.- butyl acrylate, as well as a heat stabiliser and pigments in the form of a concentrate in bisphenol A/polycarbonate were also used.

The preparation of the moulding compositions based on the components (a), (d) and, if appropriate, (e) was carried out by melting and homogenising in a suitable unit. Processing was carried out on an injection moulding machine.

The determination of the mechanical strength in the tensile test was carried out on 70% proportional bars, on the basis of DIN 53,455/ISO R 527.

The notched impact strength was determined on flat bars (80 mm × 10 mm × 4 mm) having a V-shaped notch 2.7 mm deep, on the basis of DIN 53, 452/ISO R 179.

The critical width was determined in accordance with ASTM D 256.

The impact penetration test in accordance with DIN 53,443 is characterised by an assessment of the fracture behaviour (3 = tough-brittle, 4 = tough).

The determination of the heat-distortion resistance by the Vicat (B) method was carried out in accordance with DIN 53,460/ISO 360. The resistance to petrol was tested in a screen test, during an immersion time of 5 minutes and with 0.6% outer fibre elongation, against simulated premium-grade petrol in the form of 1:1 isooctane/toluene and isooctane (42.5%)/toluene (42.5%) methanol (15%) (M-15).

TABLE 1

| Composition | Unit | Example 1 (Comparison) | Example 2 (Comparison) | Example 3 | Example 4 |
|---|---|---|---|---|---|
| Homopolycarbonate (a3) | % | 95 | 95 | — | — |
| Copolycarbonate (a1) | % | — | — | 95 | 95 |
| Polymer (d1) | % | 5 | — | 5 | — |
| Polymer (d2) | % | — | 5 | — | 5 |
| Ethylene copolymer | % | — | — | — | — |
| Polybutylene terephthalate (e) | % | — | — | — | — |
| Yield stress | MPa | 60 | 60 | 55 | 55 |
| Tensile strength | MPa | 68 | 75 | 54 | 52 |
| Elongation at break | % | 120 | 125 | 80 | 87 |
| Notched impact strength | | | | | |
| at room temperature | kJ/m$^2$ | 47 | 47 | 37 | 41 |
| at −40° C. | kJ/m$^2$ | 12 | 9 | 27 | 29 |
| Critical width | | | | | |
| at room temperature | mm | >8 | 7.6–7.8 | >8 | >8 |
| at 0° C. | mm | 6.5–6.8 | — | >8 | >8 |
| at −20° C. | mm | — | — | >8 | >8 |
| Impact penetration test at −40° C.: fracture behaviour | | 10 × 4 | 10 × 4 | 2 × 4/8 × 3 | 3 × 4/7 × 3 |
| Damaging energy | J | 75 | 70 | 54 | 50 |
| Vicat B temperature | °C. | 145 | 145 | 146 | 145 |
| Petrol resistance | | | | | |
| against 1:1 isooctane/toluene | | fracture | fracture | cracks | cracks |
| against M-15 (isooctane/toluene/methanol) | | cracks | cracks | fracture | a few cracks |

| Composition | Unit | Example 5 (Comparison) | Example 6 (Comparison) | Example 7 | Example 8 |
|---|---|---|---|---|---|
| Homopolycarbonate (a3) | % | 44 | 44 | — | — |
| Copolycarbonate (a1) | % | — | — | 44 | 44 |
| Polymer (d1) | % | 5 | — | 5 | — |
| Polymer (d2) | % | — | 5 | — | 5 |
| Ethylene copolymer | % | 2 | 2 | 2 | 2 |
| Polybutylene terephthalate (e) | % | 40 | 40 | 40 | 40 |
| Colorant concentrate[1] | % | 7 | 7 | 7 | 7 |
| Heat stabiliser[2] | % | 2 | 2 | 2 | 2 |
| Yield stress | MPa | 55 | 58 | 51 | 54 |
| Tensile strength | MPa | 59 | 59 | 55 | 56 |
| Elongation at break | % | 136 | 133 | 126 | 128 |
| Notched impact strength | | | | | |
| at room temperature | kJ/m$^2$ | 43 | 19 | 43 | 41 |
| at −40° C. | kJ/m$^2$ | 14 | 9 | 15 | 13 |
| Critical width | | | | | |
| at room temperature | mm | 5.8–6.0 | <4 | >8 | >8 |
| at 0° C. | mm | — | — | 7.0–7.2 | 4.9–5.1 |
| at −20° C. | mm | — | — | — | — |
| Impact penetration test at −40° C.: fracture behaviour | | 7 × 4/3 × 3 | 2 × 4/8 × 3 | 10 × 4 | 9 × 4/1 × 3 |
| Damaging energy | J | 65 | 69 | 62 | 69 |
| Vicat B temperature | °C. | 122 | 123 | 122 | 124 |
| Petrol-resistance | | | | | |
| against 1:1 isooctane/toluene | | cracks | cracks | a few cracks | a few cracks |
| against M-15 (isooctane/toluene/methanol) | | no cracks | no cracks | no cracks | no cracks |

| Composition | Unit | Example 9 (Comparison) | Example 10 | Example 11 | Example 12 |
|---|---|---|---|---|---|
| Homopolycarbonate (a3) | % | — | — | — | — |
| Copolycarbonate (a1) | % | 49 | 39 | 34 | 54 |
| Polymer (d1) | % | — | 10 | — | — |
| Polymer (d2) | % | — | 2 | 5 | 5 |
| Ethylene copolymer | % | 2 | 2 | 2 | 2 |
| Polybutylene terephthalate (e) | % | 40 | 40 | 50 | 30 |
| Colorant concentrate[1] | % | 7 | 7 | 7 | 7 |

TABLE 1-continued

| | | | | | |
|---|---|---|---|---|---|
| Heat stabiliser[2] | % | 2 | 2 | 2 | 2 |
| Yield stress | MPa | 59 | 44 | 53 | 54 |
| Tensile strength | MPa | 56 | 51 | 51 | 57 |
| Elongation at break | % | 112 | 150 | 149 | 108 |
| Notched impact strength | | | | | |
| at room temperature | kJ/m$^2$ | 26 | 41 | 34 | 44 |
| at −40° C. | kJ/m$^2$ | 13 | 17 | 10 | 15 |
| Critical width | | | | | |
| at room temperature | mm | 5.6–5.8 | >8 | >8 | >8 |
| at 0° C. | mm | — | >8 | <4 | 6.5–6.7 |
| at −20° C. | mm | — | 5.1–5.4 | — | — |
| Impact penetration test at −40° C.: fracture behaviour | | 10 × 4 | 10 × 4 | 7 × 4/3 × 3 | 10 × 4 |
| Damaging energy | J | 70 | 59 | 54 | 62 |
| Vicat B temperature | °C. | 125 | 115 | 123 | 123 |
| Petrol-resistance | | | | | |
| against 1:1 isooctane/toluene | | cracks | no cracks | a few cracks | cracks |
| against M-15 (isooctane/toluene/methanol) | | no cracks | no cracks | no cracks | no cracks |

[1]Grey pigment: effective amount 1% by weight;
[2]Tris(3-ethyl-oxetanyl-3-methyl) phosphite, effective amount 0.1% by weight

We claim:

1. A thermoplastic moulding composition consisting essentially of
   (a) 20–80 parts by weight of a polydiorganosiloxane polycarbonate block copolymer which has an average molecular weight $\overline{M}_w$ of 10,000 to 200,000 and contains between about 75% by weight and 97.5% by weight of aromatic carbonate structural units and between 25% by weight and 2.5% by weight of polydiorganosiloxane structural units, the block copolymer being prepared by reacting polydiorganosiloxanes which contain α,ω-bis-hydroxyaryloxy terminal groups with diphenol and a chain terminator and have a degree of polymerization $\overline{P}_n$ of 5–100,
   (b) 70–5 parts by weight of a graft polymer of an ethyleneically unsaturated monomer selected from styrene, a styrene derivative, methyl metharcrylate and a monomer mixture of 95–50% by weight of styrene, α-methylstyrene, methylmethacrylate or a mixture thereof and 5–50% by weight of acrylonitrile, methylmethacrylate, maleic anhydride or a mixture thereof, onto a rubber selected from polybutadiene, a butadiene/styrene copolymer containing up to 30% by weight of styrene as copolymerized units, a copolymer of butadiene and acrylonitrile containing up to 20% by weight of acrylontrile, a copolymer of butadiene containing up to 20% by weight of a lower alkyl ester of acrylic or methacrylic acid, and an alkyl acrylate rubber based on a $C_1$–$C_8$-alkyl acrylate, and
   (c) 5–60 parts by weight of a rubber-free thermoplastic copolymer consisting of 95–50% by weight of styrene, α-methylstyrene or a mixture thereof, with 5–50% by weight of acrylonitrile, methacrylonitrile, maleic anhydride or a mixture thereof,
   the sum of the number of parts by weight of components (a)+(b)+(c) being 100 parts by weight in each case.

2. A composition as claimed in claim 1 wherein the graft copolymer (b) contains 5–80% by weight of rubber and 95–20% by weight of grafted monomers, the rubber being present in the graft copolymer in the form of at least partially crosslinked particles having a mean particle size from 0.09 to 5 μm. maleic anhydride or a mixture thereof.

3. A composition as claimed in claim 1 or 2 wherein the component (c) is a copolymer consisting of 20–40% by weight of acrylonitrile and 80–60% by weight of styrene or α-methylstyrene.

4. A composition as claimed in any of claims 1 or 2 which is prepared by precipitating and drying a latex of the graft polymer (b), and then mixing the powder thus obtained with the block copolymer (a) and the polymer (c).

5. A composition as claimed in any of claims 1 or 2, also including a stabiliser, pigment, free-flow agent, lubricant, mould-release agent, antistatic and/or flameproofing agent.

6. A thermoplastic moulding composition as claimed in claim 1 or 2, wherein the component (a) is a mixture of one or more polydiorganosiloxane/polycarbonate block copolymers and one or more polysiloxane-free thermoplastic polycarbonates, and wherein the total content of polydiorganosiloxane structural units in the mixture is between 2.5 and 25% by weight.

* * * * *